United States Patent [19]

Hall et al.

[11] 4,330,981

[45] May 25, 1982

[54] TOWABLE GANGED MOWER

[75] Inventors: George E. Hall, Des Plaines; Jack Carr, Glenview, both of Ill.

[73] Assignee: Roseman Mower Corporation, Glenview, Ill.

[21] Appl. No.: 240,571

[22] Filed: Mar. 4, 1981

[51] Int. Cl.³ .............................................. A01D 75/30
[52] U.S. Cl. ......................................................... 56/7
[58] Field of Search ........................ 56/6, 7, 13.6, 13.7

[56] References Cited

U.S. PATENT DOCUMENTS

| | | | |
|---|---|---|---|
| 2,830,421 | 4/1958 | Blue et al. | 56/7 |
| 3,038,286 | 6/1962 | Hall | 56/7 |
| 3,058,280 | 10/1962 | Lewis | 56/6 |
| 3,224,176 | 12/1965 | Taylor | 56/7 |
| 3,525,201 | 8/1970 | Kaufman | 56/7 |
| 3,612,573 | 10/1971 | Hoffman | 280/411 |
| 3,832,835 | 9/1974 | Hall et al. | 56/7 |
| 4,161,858 | 7/1979 | Gerrits | 56/7 |

FOREIGN PATENT DOCUMENTS

| | | | |
|---|---|---|---|
| 1241751 | 8/1971 | United Kingdom | 56/7 |
| 1542661 | 3/1979 | United Kingdom | 56/7 |

*Primary Examiner*—Paul J. Hirsch
*Attorney, Agent, or Firm*—Kinzer, Plyer, Dorn & McEachran

[57] ABSTRACT

A ganged mower frame of the type which is intended to be towed by a vehicle. The frame includes a center cross bar, a right hand cross bar and a left hand cross bar. The right and left hand cross bars are each pivotally connected to the opposite ends of the center cross bar for rotation about horizontal axes. A tow bar is provided having a pivotal connection at its forward end for attachment to a towing vehicle and an attachment at its rear for rigid connection to the center cross bar. A pair of forwardly extending mower support arms are provided with each support arm being pivotally mounted for rotation about a horizontal axis on the center cross bar near the ends thereof. A mower mounting bracket is attached to the forward end of each forwardly extending mower support arm with each bracket attached to its arm for rotation about the longitudinal axis of its arm. At least one rearwardly extending mower support arm is pivotally mounted for rotation about a horizontal axis on each of the center cross bar and right and left hand cross bars. A mower mounting bracket is attached to the rear end of each of the rearwardly extending mower support arms with each bracket mounted for rotation about the longitudinal axis of its mower support arm. Hydraulic pistons and cylinders are mounted on the center and right and left hand cross bars for lifting the mower mounting brackets relative to the cross bars for transportation when the unit is not mowing.

12 Claims, 4 Drawing Figures

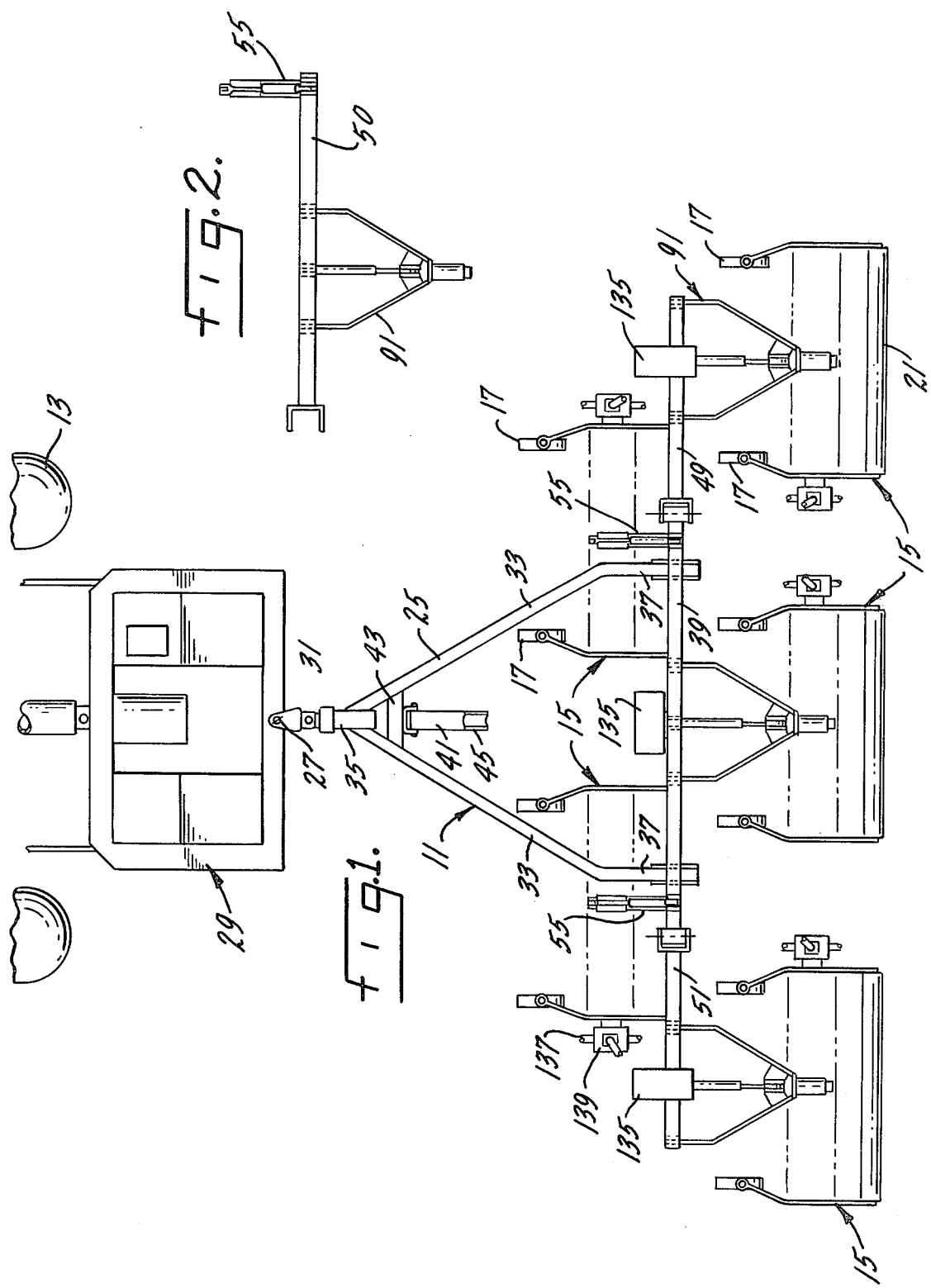

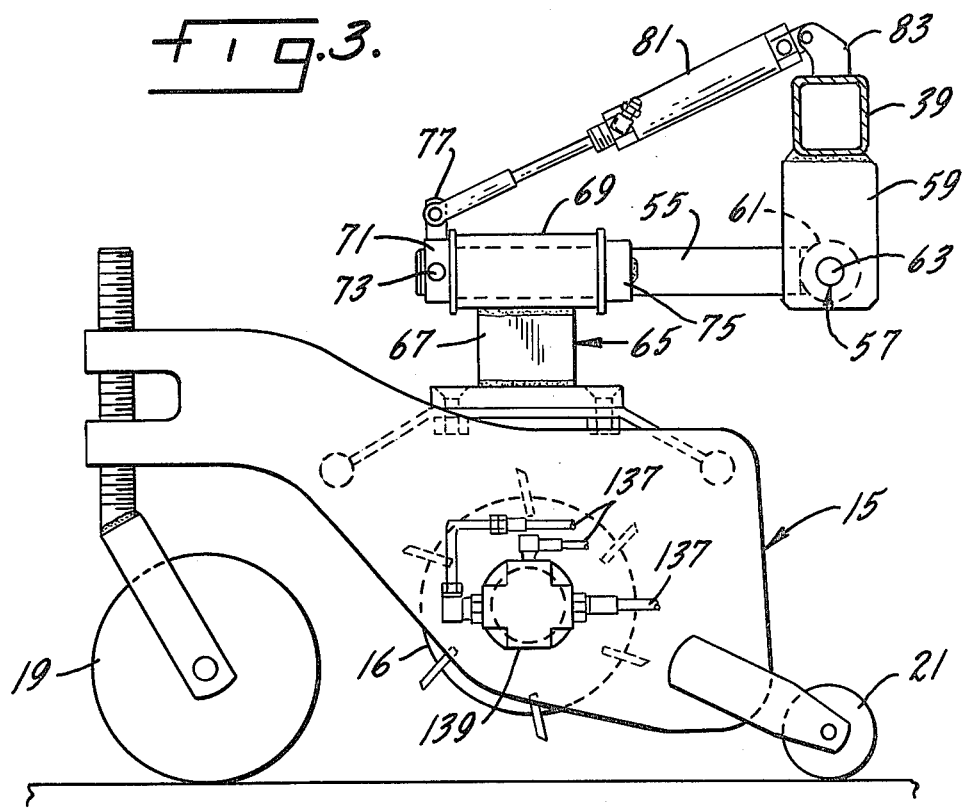
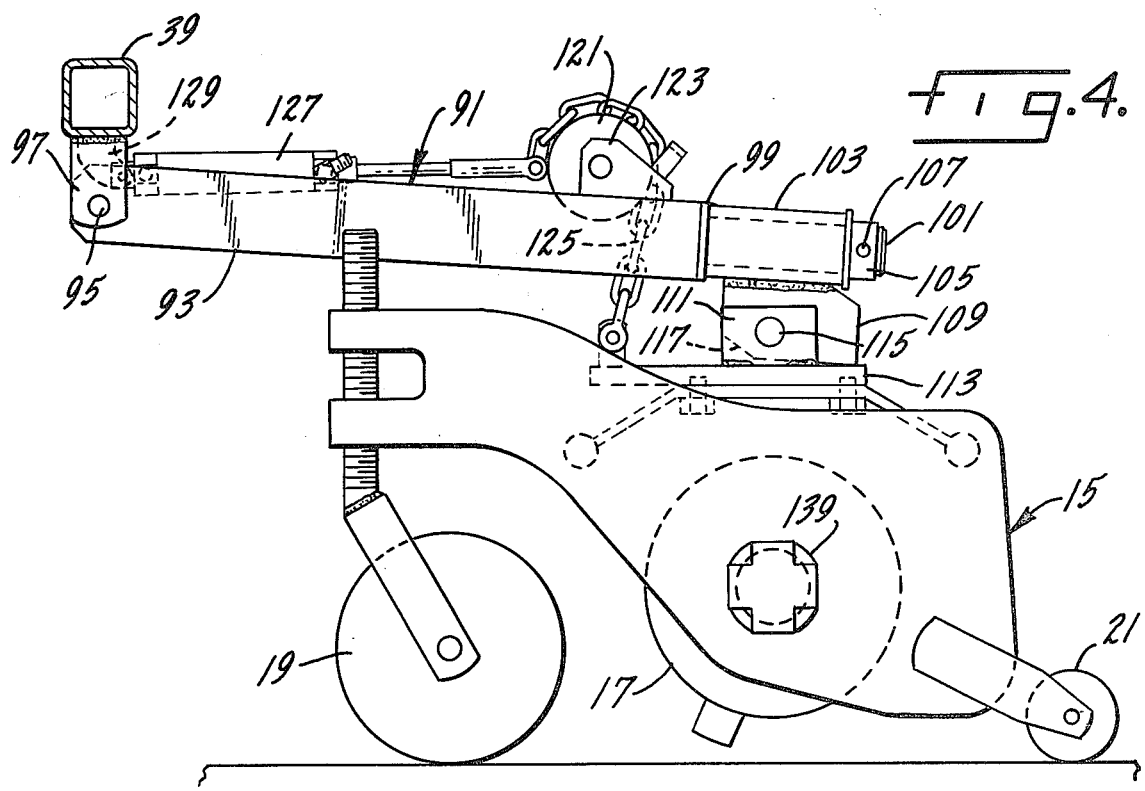

TOWABLE GANGED MOWER

SUMMARY OF THE INVENTION

This invention is directed to a towable frame for ganged hydraulic powered mowing units which maintains the mowers in overlapping alignment during cutting operations and which permits the mowers to be raised hydraulically to lift the cutting elements out of operative contact with the grass during towing.

An object of this invention is a towable ganged mower frame which permits the mowing units it carries to closely follow the undulations of the ground during cutting operations.

Another object is a towable ganged mower frame which can be adapted to accomodate three, five or seven mowing units.

Another object is a towable ganged mower frame which can be adapted to accomodate hydraulic driven reel mowers or hydraulic driven vertical mowing units for thatch control.

Other objects may be found in the following specification, claims and drawings.

BRIEF DESCRIPTION OF THE DRAWINGS

The invention is illustrated more or less diagrammatically in the following drawings wherein:

FIG. 1 is a top plan view of the mower frame of this invention adapted for five mowing units with some parts omitted, others broken away and details omitted from others for clarity of illustration;

FIG. 2 is a partial top plan view showing a longer right hand cross bar for adapting the frame of FIG. 1 to accomodate seven mowing units;

FIG. 3 is an enlarged side elevational view showing a typical forwardly extending mower support arm with some parts shown in cross section and others omitted for clarity of illustration; and FIG. 4 is an enlarged side elevational view of a typical rearwardly extending support arm which some parts shown in cross section for clarity of illustration.

DESCRIPTION OF THE PREFERRED EMBODIMENTS

FIG. 1 shows a five gang mower unit with the towable frame 11 of this invention attached to an industrial or farm type tractor 3 which has a three point hitch and a live power takeoff. The towable frame 11 is particuarly intended for use with hydraulic powered mowers 15 having reels 16 or vertical mowing units 17 for thatch control. The mowers 15 for the reels 16 and vertical mowing units 17 for thatch control are of the type having front caster wheels 19 and a ground engaging rear roller 21. A typical mower equipped with a reel 16 is shown in FIG. 3 and a typical mower equipped with a vertical mowing unit 17 for thatch control is shown in FIG. 4. Reels and vertical mowing units are not used together on a frame 11 at any one time.

The towable frame 11 includes a tow bar 25 which may be pivotally connected to the tractor or as shown here in the drawings to a vertical pin 27 mounted on a hydraulic pump and reservoir unit 29 attached to the three point hitch of the tractor. The tow bar includes a pivotally mounted clevis 31 at its forward end which clevis receives the pin 27. The tow bar has a pair of arms 33 which converge and connect at its front to a tube 35 which has the clevis 31 mounted on the forward end thereof. The arms diverge rearwardly and are bent at their rearward ends 37 to be parallel. The parallel ends 37 of the arms are rigidly connected to a center cross bar 39.

An arm 41 for supporting flexible hydraulic hoses (omitted or broken away in the drawings for clarity of illustration) extends upwardly from a cross brace 43 extending between the arms 33 near their apex. The supporting arm 41 is pivotally connected at its base to the cross brace 43 and is provided with a saddle-like support 45 at its upper end for receiving the flexible hydraulic hoses.

The center cross bar 39 is an elongated tubular member of generally square transverse cross section. Pivotally attached to opposite ends of the center cross bar are right hand and left hand cross bars 49 and 51 respectively. The right and left hand cross bars are pivotally connected for generally vertical movement relative to the center cross bar.

A pair of forwardly extending mower support arms 55 are pivotally mounted on the center cross bar 39 with one support arm being located near each end of the cross bar. Also, when a seven gang mower unit is desired, a forwardly extending support arm 55 is pivotally mounted on each of longer right and left hand cross bars and with the pivotal connections of the arms being located at the outer ends of these cross bars. Only a longer right hand cross bar 50 is shown in FIG. 2. A similar left hand cross bar would be provided but is not shown. Each pivotal connection 57 (shown in detail in FIG. 3) consists of a pair of downwardly extending lugs 59 attached to a cross bar. A tubular sleeve 61 affixed to the end of the mower support arms 55 fits between the lugs and is held by a pin 63.

A mower support bracket 65 is mounted on the forward end of each mower support arm 55. It is mounted so that it can be rotated about the longitudinal axis of the mower support arm. The mower support bracket 65 is connected by a vertical plate 67 to a sleeve 69 which slides over the end of the mower support arm 55. The sleeve is held on the arm by a collar 71 at the end of the mower support arm which is held against rotation by a pin 73. Another collar 75 on the support arm is located inwardly of the sleeve 69 to prevent longitudinal movement of the sleeve on the mower support arm. A lug 77 is attached to the collar 71 and extends upwardly from the mower support arm.

A hydraulic cylinder and piston 81 is provided for each forwardly extending mower support arm 55. One end of the hydraulic cylinder and piston is pivotally connected to a pair of upstanding lugs 83 formed on a center cross bar 39 or a right or left hand cross bar 49, 50 and 51. The opposite end of the hydraulic cylinder and piston are pivotally connected to the upstanding lug 77 at the forward end of the mower support arm 55. The mower support bracket 65 is rigidly fastened to either a mower 15 equipped with a reel 16 as shown in FIG. 3 or a vertical mowing unit 17 for thatch control as shown in FIG. 4.

A rearwardly extending mower support arm 91 is connected to each of the center, right and left cross bars 39, 49, 50 and 51 respectively. Each support arm 91 (shown in detail in FIG. 4) consists of a somewhat U-shaped member having arms 93 with the arms pivotally connected at 95 to pairs of lugs 97 downwardly extending from each of the cross members. The rearward portion of the arms 93 are joined by a plate 99 to which a stub shaft 101 is connected. A sleeve 103 slides over the stub shaft and is held in position by a collar 105 fastened in a position by a pin 107 and the plate 99. A downwardly extending plate 109 is secured to the sleeve 103. A pair of lugs 111 attached to a mower support bracket 113 straddle the plate 109 and are fastened thereto by a pin 115. A forward edge of the plate 109 is notched at 117 to permit limited pivotal movement of the bracket 13 relative to the plate 109.

A pulley 121 is supported on upstanding lugs 123 mounted on the U-shaped arms 93 adjacent the end plate 99. A chain 125 which rides on this pulley connects to one end of a hydraulic cylinder and piston 127 having an opposite end pivotally connected to downwardly extending lugs 129 mounted on the lower surface of center, right or left cross bars 39, 49 and 51 respectively. The opposite end of the chain is fastened to the bracket 113 at a point forward of the center of gravity of a mower 15 equipped with a reel 16 or a vertical mowing unit 17 as is shown in FIG. 4.

Hydraulic distribution valves 135 are mounted at the centers of the top surfaces of the center cross bar 39 and right and left hand cross bars 49 and 51. Flexible hydraulic hoses 137 lead from these distribution valves to hydraulic motors 139 located on the mowers 15 attached to the mower support arms. Additional flexible hydraulic hoses 137 lead from the center hydraulic distribution valves 135 to the hydraulic pump and reservoir unit mounted on the tractor. Other flexible hydraulic hoses connect to the hydraulic cylinder and piston units 81 and 127. These flexible hydraulic hoses connect the hydraulic cylinders and pistons with the hydraulic system of the tractor and are separate from the hydraulic hoses supplying the hydraulic motors. The flexible hydraulic hoses are equipped with spring biased closing ball check valves at the ends thereof so that the hoses may be easily connected and disconnected from the distribution valves, hydraulic motors and cylinders and pistons.

The use, operation and function of the invention are as follows:

The towable frame 11 of this invention can be adapted to handling three, five or seven hydraulically powered mowers 15 equipped with reels 16 or vertical mowing units 17 for thatch control. The embodiment shown in the drawings is intended for supporting five mowing or thatching units. If a seven mower unit is desired, the right and left hand cross bars 49 and 51 are removed and longer right and left hand cross bars are provided. Also, forwardly extending mower support arms are installed on these longer cross arms. If a three mower unit is desired, then only the center cross bar 39 is utilized and the right and left hand cross bars 49 and 51 and their forwardly and rearwardly extending mower arms and mowers are omitted. Due to the design of the hydraulic distribution valves 135 the right and left hand cross bars and their mowers can be hydraulically disconnected simply by removing the flexible hydraulic hoses 137 extending from the center distribution valve to the right and left hand distribution valves which are mounted on the right and left hand cross bars.

The mowers can closely follow the undulations of the ground both in and across their paths of travel even though the mowers are operated at a relatively high speeds because of the manner of their connections to their mower support arms. The front mowers are guided by their front caster wheels 19 in combination with the rear roller 21. The forward extending mower support arm 55 is connected to its mower so that it maintains straight steering of its unit. The mower can rotate to a limited degree about the longitudinal axis of the mower support arm and the support arm and mower can move about a horizontal axis relative to the cross bars but are held against wobble or misalignment in the forward direction.

In like manner, the connection of the rearward extending support arms to their mowers permit up and down movement due to the pivotal connection of the mower arm to the cross bars at 95 and also permit rotation of the mower about the longitudinal axis of the cross member. However, the connection maintains the mower in proper trailing alignment.

This invention permits the mowers to be lifted partially off the ground during transporting operations. Actuation of the hydraulic cylinder and piston assemblies 81 will lift the forward ends of the front mowers so as to raise the front caster wheels 17 off the ground and put all the weight of the mower unit on the rear roller 21. In like manner, retraction of the hydraulic cylinder and piston units 127 will lift the front portion of the rear mowers through means of the chain 125 to lift the front caster wheels off the ground and place the weight of the mower units on the rear roller 21. The forward and rearwardly extending mower arms connect to the tops of the mower at approximately the center of each mower. However, the lifting connections are forward of the center of the mower so as to tip the mower and render it unnecessary to lift the mower entirely off the ground during transportation operations.

Whereas the preferred forms of the invention have been described and shown, it should be understood that there are modifications, alterations and changes which may be made without departing from the teachings of this invention. Therefore, the scope of the invention should be limited only by claims attached hereto.

We claim:

1. A ganged mower frame of the type which is towed by a vehicle, said frame including:
   a center cross bar, a right hand cross bar and a left hand cross bar,
   each of the right and left hand cross bars being pivotally connected to the opposite ends of the center cross bar for rotation about a horizontal axis,
   a tow bar having a pivotal connection at its forward end for attachment to a towing vehicle and attachment means at its rear for rigid connection to the center cross bar,
   a pair of forwardly extending mower support arms, each support arm being pivotally mounted for rotation about a horizontal axis on the center cross bar near the ends thereof,
   a mower mounting bracket attached to the forward end of each forwardly extending mower support arm with each bracket attached to its arm for rotation about the longitudinal axis of its arm,
   at least one rearwardly extending mower support arm pivotally mounted for rotation about a horizontal axis on each of the center cross bar and right and left hand cross bars,
   a mower mounting bracket attached to the rear end of each of the rearwardly extending mower support arms with each bracket mounted for rotation about the longitudinal axis of its mower support arm, and
   hydraulic piston and cylinder means mounted on the center and right and left hand cross bars for lifting said mower mounting brackets relative to the cross bars for transportation.

2. The mower frame of claim 1 in which the hydraulic piston and cylinder means mounted on the center, right and left hand cross bars are connected to each forwardly extending support arm.

3. The mower frame of claim 1 in which each bracket associated with a rearwardly extending mower support arm is attached to the arm for limited rotation about a horizontal axis and the hydraulic piston and cylinder means are connected to each of these mower mounting brackets.

4. The mower frame of claim 3 in which the hydraulic piston and cylinder means are connected to each of the rearwardly located mower mounting brackets by a chain which is guided on a pulley supported on the rearwardly extending support arm.

5. The mower frame of claim 2 in which the hydraulic piston and cylinder means are connected to each forwardly extending mower support arm so as to lift the forward end of an attached mower.

6. The mower frame of claim 3 in which the hydraulic piston and cylinder means are connected to each rearwardly extending mower mounting bracket to lift the forward end of an attached mower.

7. The ganged mower frame of claim 1 including mowers connected to the mower mounting brackets.

8. The ganged mower frame of claim 7 in which the mowers are equipped with hydraulic motors.

9. The ganged mower frame of claim 7 in which each mower includes ground engaging means on the mower for supporting and steering the mower during operation.

10. The ganged mower of claim 9 in which the ground engaging means includes a pair of caster wheels at the front of the mower and a roller at the rear of the mower.

11. The ganged mower of claim 9 in which the mower is a reel mower.

12. The ganged mower of claim 9 in which the mower is a vertical mowing unit for thatch control.

* * * * *